United States Patent
Chen

(10) Patent No.: US 7,826,327 B2
(45) Date of Patent: Nov. 2, 2010

(54) METHOD FOR ACQUIRING OPTIMUM POSITION OF RESERVED BLOCK IN HOLOGRAPHIC STORAGE SYSTEM

(75) Inventor: Yin-Ying Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 325 days.

(21) Appl. No.: 12/132,340

(22) Filed: Jun. 3, 2008

(65) Prior Publication Data

US 2008/0310282 A1    Dec. 18, 2008

(30) Foreign Application Priority Data

Jun. 12, 2007   (CN)   ................. 2007 1 0110977

(51) Int. Cl.
*G11B 7/00*   (2006.01)
(52) U.S. Cl. .................. 369/103; 369/124.08
(58) Field of Classification Search ........ 369/103, 369/124.07, 124.08
See application file for complete search history.

(56) References Cited

U.S. PATENT DOCUMENTS 7,623,279 B1 *  11/2009  Ayres .................... 359/22
2005/0286388 A1 *  12/2005  Ayres et al. ............ 369/103

\* cited by examiner

*Primary Examiner*—Wayne R Young
*Assistant Examiner*—Adam R Giesy
(74) *Attorney, Agent, or Firm*—Thomas, Kayden, Horstemeyer & Risley, LLP

(57) ABSTRACT

A method for acquiring an optimum position of a reserved block in a holographic storage system is provided. Firstly, an initial offset error between an initial reserved block and its two nearest neighbors is computed. Then, according to a dynamically adjustable modified centroid function β', a second reserved block is obtained by interpolating the covariance values associated with the initial reserved block and the respective two nearest neighbors. Afterwards, the optimum position of the reserved block is acquired according to the second reserved block and the initial offset error.

9 Claims, 3 Drawing Sheets

METHOD FOR ACQUIRING OPTIMUM POSITION OF RESERVED BLOCK IN HOLOGRAPHIC STORAGE SYSTEM

FIELD OF THE INVENTION

The present invention relates to a method for acquiring a reserved block in a holographic storage system, and more particularly to a method for acquiring an optimum position of a reserved block in a holographic storage system.

BACKGROUND OF THE INVENTION

Many data storage media such as optical media or magnetic media have been developed to store data. With the increasing development of digitalized generation, the data storage density for the conventional data storage media is unsatisfactory. Nowadays, for dealing with such a problem, a holographic storage technology is developed by using holographic storage media to store data. A holographic storage medium has a largest capacity of about 3.9 TB (terabyte) among various storage devices. Perhaps, the holographic storage technology is succeeded after the HD-DVD or Blu-ray technology to be the most popular data storage technology.

In a typical holographic storage system, a laser beam is split into two beams by a beam splitter. These two beams are served as an object beam and a reference beam, respectively. The object beam and the reference beam are coherent. The object beam illuminates the object (pixel data or data page on data plane) and then the object scatters light onto the holographic storage medium. The object beam interferes with the reference beam to form an interference pattern such that a diffraction grating is recorded in the holographic storage medium. For reading pixel data from the holographic storage medium, the interference patterns recorded in the holographic storage medium are diffracted with the reference beam and thus a reconstructed object beam is obtained. Then, the reconstructed object beam is detected by a photo detector for obtaining the pixel data.

It is very important to remain optically stable in order for making and viewing a hologram. Any relative movement of the object beam and the reference beam may result in image shift when the pixel data are detected by the photo detector. Due to the image shift, the pixel data read from the holographic storage medium are inaccurate. For compensating the pixel data, a holographic storage system is disclosed in US Patent Publication No. 2005/0286388, which is assigned to InPhase Technologies, Inc. and the contents of which are hereby incorporated by reference. In such a holographic storage system, predetermined reserved blocks are assigned throughout each data page. By searching the reserved blocks, the image shift is realized. According to the image shift, the position errors are determined. The pixel data are then compensated according to the corresponding position errors. Therefore, it is very important to search the reserved blocks after a data page is received by the holographic storage system. After the reserved blocks are searched, the pixel data may be accurately detected and further decoded.

US Patent Publication No. 2005/0286388 also discloses a method of searching a reserved block. In accordance with InPhase's design, a reserved block having 8×8 pixel data of known pixel patterns is served as a reference block. When an image with 64×64 pixel data is read by the holographic storage system, a series of unit blocks with 8×8 pixel data are successively scanned and then correlations associated with respective unit blocks and the reference block are calculated. The unit block with the highest correlation denotes the reserved block. In a case that the real position of the reserved block in the x-axis is 3.4, the possible x-axis position of the reserved block computed by correlation is 3 because this conventional method has a resolution of one pixel. However, the resolution is not satisfied. In practice, the resolution of at most 0.05 pixel is desired in the holographic storage system.

For increasing the resolution, an interpolation method is used to determine a reserved block according to US Patent Publication No. 2005/0286388. FIGS. 1A and 1B are schematic diagrams illustrating the reserved blocks acquired by the interpolation method in an ideal situation and a real situation, respectively. In the ideal situation as shown in FIG. 1A, the initial reserved block Xbest is located at 0 in the x-axis and its nearest neighbors Xbest+1 and Xbest−1 are located at 1 and −1, respectively. Due to symmetry of the nearest neighbors Xbest+1 and Xbest−1 with respect to the initial reserved block Xbest, a proper reserved block at the position 21 is acquired by interpolating the corrections associated with the initial reserved block Xbest and its respective nearest neighbors Xbest+1 and Xbest−1. The position 21 is overlapped with the initial reserved block Xbest. In the real situation, however, an image shift is readily generated when the pixel data are read from the holographic storage medium. In the real situation, as shown in FIG. 1B, a reserved block at the position 22 is acquired by interpolating the corrections associated with the initial reserved block Xbest and its respective nearest neighbors Xbest+1 and Xbest−1. Due to the inherent property of the holographic storage system, an initial offset error 23 between the position 21 (the ideal situation) and the position 22 (the real situation) is readily generated.

FIG. 2 schematically illustrates an initial reserved block and its four nearest neighbors for computing the initial offset error. As previously described, the initial offset error is resulted from unequal similarity of pixels. As shown in FIG. 2, an initial reserved block 31 is a block with 8×8 pixel data. For computing the initial offset error, the correlations between the initial reserved block 31 and its four nearest neighbors (immediately above, below, to the left, and to the right of the initial reserved block 31 by one pixel, i.e. in the detected data page 30) are respectively computed. In other word, the initial offset error in the x-axis position is computed according to the correlation between the initial reserved block 31 and its left neighbor 32 and the correlation between the initial reserved block 31 and its right neighbor 33. Similarly, the initial offset error in the y-axis position is computed according to the correlation between the initial reserved block 31 and the neighbor immediately above the initial reserved block 31 (i.e. the block 34) and the correlation between the initial reserved block 31 and the neighbor immediately below the initial reserved block 31 (i.e. the block 35). Meanwhile, the initial offset errors resulted from unequal similarity of pixels in the x-axis and y-axis positions are realized.

As previously described, after the initial reserved block Xbest is computed by means of the correlation, a more precise x-axis position of the reserved block will be acquired by interpolating the corrections associated with the initial reserved block Xbest and its respective nearest neighbors Xbest+1 and Xbest−1. After undue experiments and simulations, however, it is found that the initial offset error is readily resulted from unequal similarity of pixels.

For solving the above drawbacks, US Patent Publication No. 2005/0286388 also discloses a method of searching a second reserved block Xbest' by interpolating the covariance values associated with the initial reserved block Xbest and its respective neighbors Xbest+1 and Xbest−1 according to a modified centroid function β. An estimated second reserved block is determined by the following equation:

$$\Delta \hat{r} = \frac{\sum_{i=-1}^{1}(\Delta r_{max} - i\beta)\text{cov}(\Delta r_{max} - i, \Delta c_{max})}{\sum_{i=-1}^{1}\text{cov}(\Delta r_{max} - i, \Delta c_{max})}$$

$\Delta \hat{r}$: a distance between the second reserved block Xbest' and initial reserved block Xbest, i.e. the x-axis offset $\Delta r_{max}$: the x-axis position of the initial reserved block Xbest $\beta$: modified centroid function, which is a constant $\Delta c_{max}$: the y-axis position of the initial reserved block Xbest cov(f): covariance value In the above equation, a more precise second reserved block Xbest' is obtained by interpolating the covariance values associated with the initial reserved block Xbest and its respective neighbors Xbest+1 and Xbest−1 according to the modified centroid function $\beta$. In other words, the distances between the reserved block Xbest and the Xbest+1/Xbest−1 are corrected by the modified centroid function $\beta$.

Since the modified centroid function $\beta$ is a constant, the x-axis initial offset error is considerable if there is large unequal similarity of pixels. Please refer to FIG. 3, which schematically illustrates some possibly offset positions resulted from the unequal similarity of pixels according to method disclosed in US Patent Publication No. 2005/0286388. For clarification, only some possibly offset positions in the range between Xbest+1 and Xbest−1 are illustrated in the drawings. As shown in FIG. 3, these offset positions are nonlinearly increased. In other words, the intervals between adjacent offset positions are not identical. As the offset position is gradually close to Xbest+1, the interval between adjacent offset positions is increased. For example, the offset position 41 has a smaller x-axis offset than the offset position 42. Under this circumstance, the second reserved block Xbest' obtained at the offset position 41 has a larger resolution than that obtained at the offset position 42.

Although the InPhase's method is used to acquire the reserved block and compensate the position error according to the reserved block, there are still some drawbacks. For example, undue experiments demonstrated that the compensated error is still too large to comply with the stringent optical requirements of the holographic storage system.

Therefore, there is a need of providing a method for acquiring a more precise position of the reserved block to obviate the drawbacks encountered from the prior art.

SUMMARY OF THE INVENTION

The present invention provides a method for acquiring an optimum position of a reserved block in a holographic storage system, in which the unequal similarity of pixels is taken into consideration, so as to increase the resolution of reading pixel data.

In accordance with an aspect of the present invention, there is provided a method for acquiring an optimum position of a reserved block in a holographic storage system. Firstly, an initial offset error between an initial reserved block and its two nearest neighbors is computed. Then, according to a dynamically adjustable modified centroid function $\beta'$, a second reserved block is obtained by interpolating the covariance values associated with the initial reserved block and the respective two nearest neighbors. Afterwards, the optimum position of the reserved block is acquired according to the second reserved block and the initial offset error.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As previously described, it is very important to acquire the optimum position of the reserved block in the holographic storage system. If the resolution of the reserved block is insufficient, the bit error rate of the system is increased. For obviating the drawbacks encountered from the prior art, the present invention provides a method for acquiring an optimum position of a reserved block in a holographic storage system.

Figure 4:
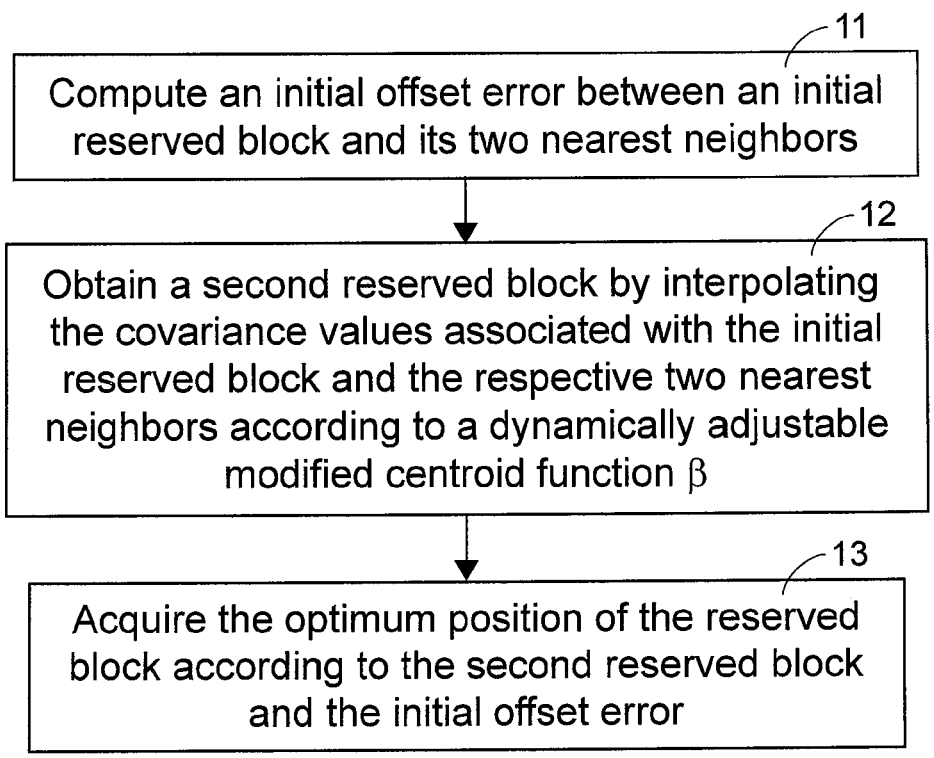
FIG. 4 schematically illustrates a flowchart of a method for acquiring an optimum position of a reserved block in a holographic storage system.

Hereinafter, a method for acquiring an optimum position of a reserved block in a holographic storage system according to the present invention will be illustrated with reference to a flowchart of FIG. 4.

First of all, an initial offset error between an initial reserved block Xbest and its nearest neighbors Xbest+1 and Xbest−1 is computed (Step 11).

Figure 1A:
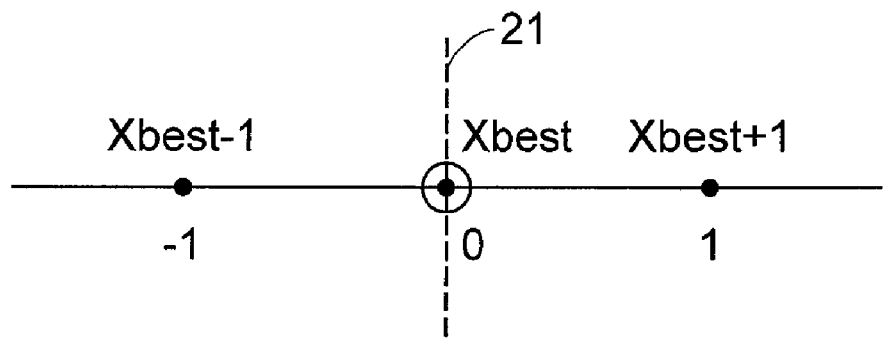
FIGS. 1A and 1B are schematic diagrams illustrating the reserved blocks acquired by the interpolation method in an ideal situation and a real situation, respectively.
Figure 1B:
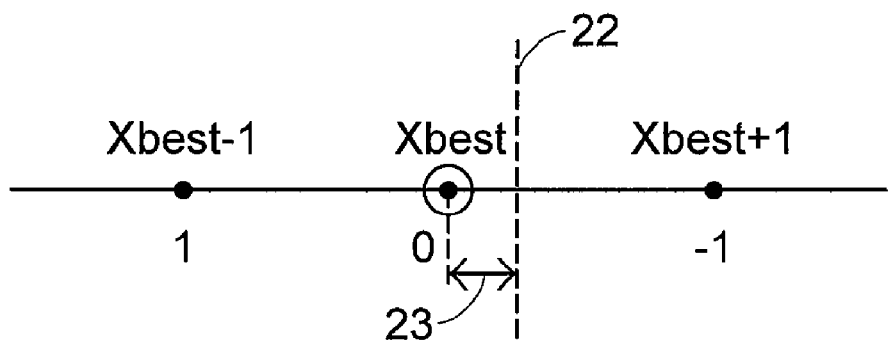
Figure 2:
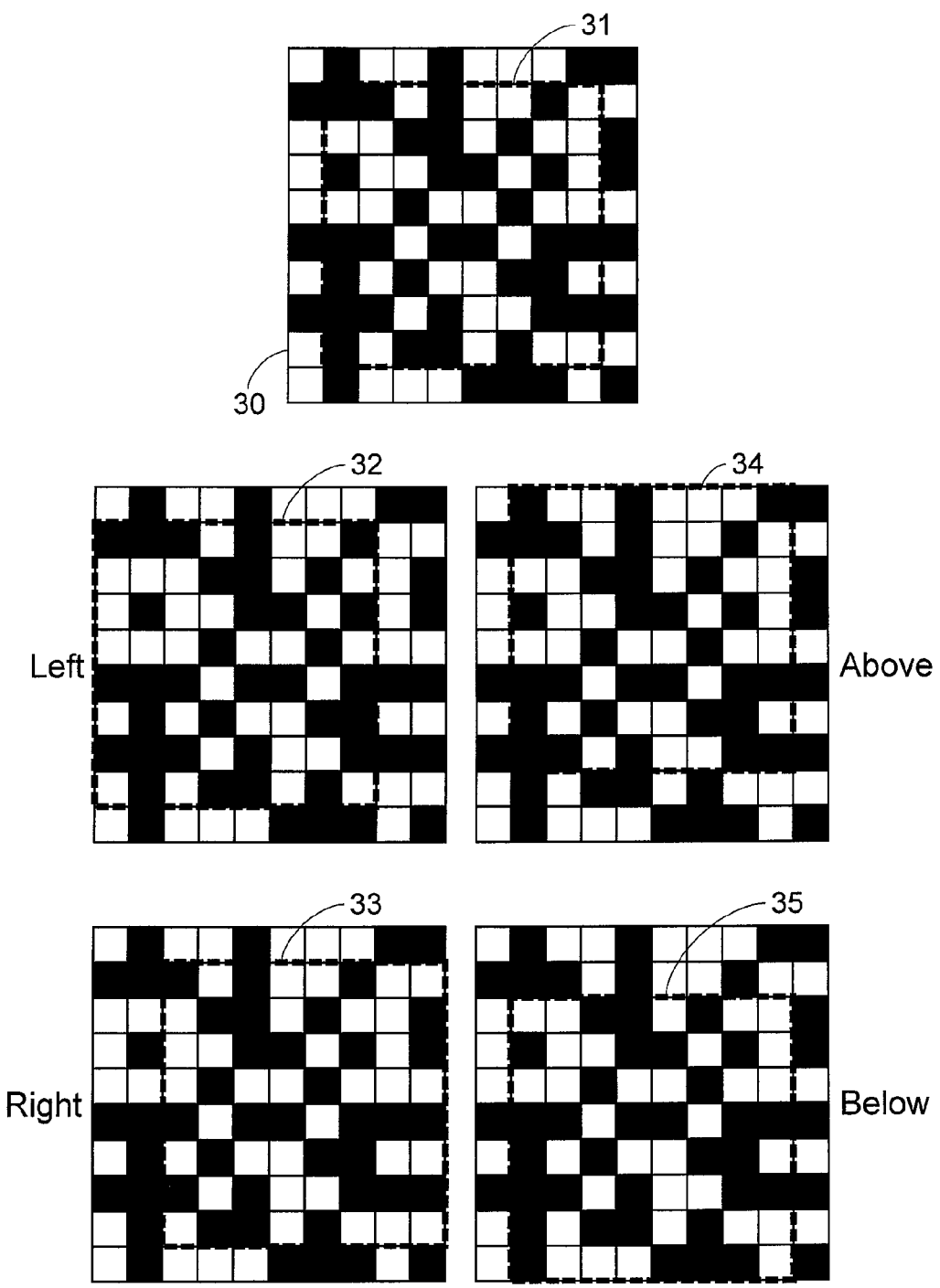
FIG. 2 schematically illustrates an initial reserved block and its four nearest neighbors for computing the initial offset error.
Figure 3:
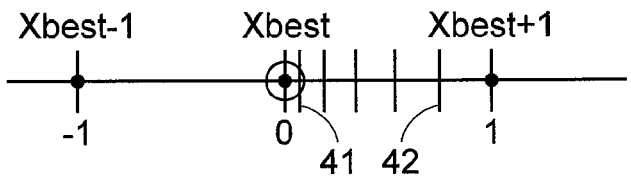
FIG. 3 schematically illustrates some possible offset positions resulted from the unequal similarity of pixels according to a conventional method.

The procedure of obtaining the initial offset error is similar to that described in FIGS. 1 and 2. For example, a reserved block at the position 22 is acquired by interpolating the corrections associated with the initial reserved block Xbest and its respective nearest neighbors Xbest+1 and Xbest−1. Due to the inherent property of the holographic storage system, the initial offset error 23 is computed.

Next, according to a dynamically adjustable modified centroid function $\beta'$, a second reserved block Xbest' is obtained by interpolating the covariance values associated with the initial reserved block Xbest and its respective nearest neighbors Xbest+1 and Xbest−1 (Step 12).

In a case that the unequal similarity of pixels is taken into consideration, the estimated second reserved block is determined from dynamically adjustable modified centroid function $\beta'$.

$$\Delta \hat{r} = \frac{\sum_{i=1,-1}^{1} (\Delta r_{max} - i\beta) \text{cov}(\Delta r_{max} - i, \Delta c_{max})}{\sum_{i=1,-1}^{1} \text{cov}(\Delta r_{max} - i, \Delta c_{max})}$$

$$\beta' = \frac{\text{cov}(\Delta r_{max} - i, \Delta c_{max})}{(\Delta r_{max}, \Delta c_{max})} \times \beta$$

$\Delta \hat{r}$: a distance between the second reserved block Xbest' and initial reserved block Xbest, i.e. the x-axis offset $\Delta r_{max}$: the x-axis position of the initial reserved block Xbest $\beta$: modified centroid function, which is to a constant $\beta'$: the dynamically adjustable modified centroid function $\Delta c_{max}$: the y-axis position of the initial reserved block Xbest cov(f): covariance value In the above equation, the x-axis offset is computed according to the dynamically adjustable modified centroid function $\beta'$. Since the dynamically adjustable modified centroid function $\beta'$ correlates with the similarity of Xbest+1 and Xbest−1, the error generated from the unequal similarity of pixels can be corrected by the dynamically adjustable modified centroid function $\beta'$.

Figure 5:
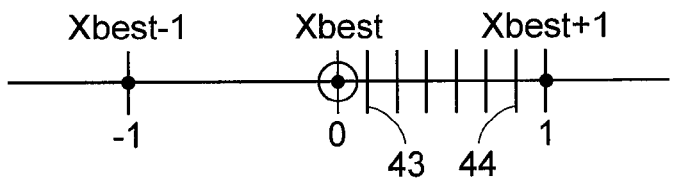
FIG. 5 schematically illustrates some possible offset positions resulted from the unequal similarity of pixels according to the method of the present invention.

Please refer to FIG. 5, which schematically illustrates some possible offset positions resulted from the unequal similarity of pixels according to the method of the present invention. As shown in FIG. 5, these offset positions are linearly increased. Since the unequal similarity of pixels is taken into consideration, the intervals between adjacent offset positions are substantially identical. In other words, the offset position 43 close to the initial reserved block Xbest has the same x-axis offset as the offset position 44 close to Xbest+1. Under this circumstance, the second reserved blocks Xbest' obtained at the all offset positions between Xbest+1 and Xbest−1 have substantially identical resolutions. Since the error generated from the unequal similarity of pixels is compensated by the dynamically adjustable modified centroid function $\beta'$, the second reserved block Xbest' obtained by the method of the present invention is more precise.

Next, an optimum position Xoptimum of the reserved block is acquired according to the second reserved block Xbest' and the initial offset error (Step 13).

After the initial offset error is computed in the Step 11 and the second reserved block Xbest' is computed in the Step 12, the initial offset error is subtracted from the second reserved block Xbest' so as to acquire an optimum position Xoptimum of the reserved block.

From the above description, the method of the present invention is capable of acquiring an optimum position of a reserved block in a holographic storage system. Since the unequal similarity of pixels is taken into consideration, the resolution of reading pixel data is enhanced. The use of the dynamically adjustable modified centroid function $\beta'$ can compute the offset error and thus correct the error generated from the unequal similarity of pixels.

Table 1 and Table 2 demonstrate the simulation results of the present method in comparison with the conventional method.

In the simulation results of Table 1, no noise is introduced into the pixel data. The data shown in Table 1 indicate the errors obtained at four nearest neighbors (immediately above, below, to the left, and to the right) of the initial reserved block by the present invention (Example 1) and the interpolation method of US Patent Publication No. 2005/0286388

COMPARATIVE EXAMPLE 1

TABLE 1 data without noise

|  |  | below (% pixel) | above (% pixel) | left (% pixel) | right (% pixel) | Average error |
|---|---|---|---|---|---|---|
| Example 1 | (y) mean | 0.53 | 0 | 0.52 | 0 | 0.26 |
|  | (x) mean | 0 | 0.77 | 0 | 0.74 | 0.38 |
|  | (y) std | 0.12 | 0 | 0.17 | 0 | 0.07 |
|  | (x) std | 0 | 0.14 | 0 | 0.15 | 0.07 |
| Com. Example 1 | (y) mean | 0.71 | 0.96 | 0.93 | 0.9 | 0.86 |
|  | (x) mean | 1.02 | 0.82 | 1.1 | 0.79 | 0.93 |
|  | (y) std | 0.28 | 0.32 | 0.6 | 0.34 | 0.39 |
|  | (x) std | 0.15 | 0.18 | 0.16 | 0.16 | 0.16 |

In the simulation results of Table 2, some noise is introduced into the pixel data. The data shown in Table 2 indicate the errors obtained at four nearest neighbors (immediately above, below, to the left, and to the right) of the initial reserved block by the present invention (Example 2) and the interpolation method of US Patent Publication No. 2005/0286388

COMPARATIVE EXAMPLE 2

TABLE 2 data with noise

|  |  | below (% pixel) | above (% pixel) | left (% pixel) | right (% pixel) | Average error |
|---|---|---|---|---|---|---|
| Example 2 | (y) mean | 1.36 | 0.05 | 1.15 | 0.05 | 0.65 |
|  | (x) mean | 0.02 | 1.54 | 0.04 | 1.42 | 0.76 |
|  | (y) std | 0.53 | 0.11 | 0.26 | 0.07 | 0.24 |
|  | (x) std | 0.03 | 0.33 | 0.06 | 0.33 | 0.19 |
| Com. Example 2 | (y) mean | 1.96 | 2.18 | 1.6 | 2.14 | 1.97 |
|  | (x) mean | 1.34 | 1.31 | 1.35 | 1.31 | 1.33 |
|  | (y) std | 0.62 | 0.37 | 0.5 | 0.26 | 0.44 |
|  | (x) std | 0.12 | 0.38 | 0.15 | 0.36 | 0.25 |

The above two examples demonstrate that the errors generated from the simulation results of the present method are very much smaller than those generated from the interpolation method of US Patent Publication No. 2005/0286388, regardless of the data with noise or the date without noise. Therefore, the method of present invention is effective to acquire an optimum position of a reserved block in a holographic storage system.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for acquiring a position of a reserved block in a holographic storage system, the method comprising steps of:
   searching, using a photo detector, an initial reserved block and obtaining the positions of the initial reserved block and its two nearest neighbors;
   computing an initial offset error between the initial reserved block and its two nearest neighbors;
   obtaining a second reserved block by interpolating the covariance values associated with the initial reserved block and the respective two nearest neighbors according to a dynamically adjustable modified centroid function β'; and
   acquiring the position of the reserved block according to the second reserved block and the initial offset error.

2. The method according to claim 1 wherein the two nearest neighbors includes a first nearest neighbor immediately to the right of the initial reserved block by one pixel along the x-axis and a second nearest neighbor immediately to the left of the initial reserved block by one pixel along the x-axis.

3. The method according to claim 2 wherein the initial offset error along the x-axis is computed according to the corrections associated with the initial reserved block and the two nearest neighbors.

4. The method according to claim 3 wherein the initial offset error along the x-axis is computed by interpolating the corrections associated with the initial reserved block and the two nearest neighbors.

5. The method according to claim 1 wherein the two nearest neighbors includes a first nearest neighbor immediately above the initial reserved block by one pixel along the y-axis and a second nearest neighbor immediately below the initial reserved block by one pixel along the y-axis.

6. The method according to claim 5 wherein the initial offset error along the y-axis is computed according to the corrections associated with the initial reserved block and the two nearest neighbors.

7. The method according to claim 6 wherein the initial offset error along the y-axis is computed by interpolating the corrections associated with the initial reserved block and the two nearest neighbors.

8. The method according to claim 1 wherein the second reserved block is determined by the following equation:

$$\Delta \hat{r} = \frac{\sum_{i=1,-1}^{1} (\Delta r_{max} - i\beta') \text{cov}(\Delta r_{max} - i, \Delta c_{max})}{\sum_{i=1,-1}^{1} \text{cov}(\Delta r_{max} - i, \Delta c_{max})}$$

$$\beta' = \frac{\text{cov}(\Delta r_{max} - i, \Delta c_{max})}{(\Delta r_{max}, \Delta c_{max})} \times \beta$$

$\Delta \hat{r}$: an offset between the second reserved block and initial reserved block;
$\Delta r_{max}$: the x-axis position of the initial reserved block
$\beta$: a modified centroid function, which is a constant
$\beta'$: the dynamically adjustable modified centroid function
$\Delta c_{max}$: the y-axis position of the initial reserved block
cov(f): covariance value.

9. The method according to claim 1 wherein the optimum reserve block is acquired by subtracting the initial offset error from the second reserved block.

* * * * *